(12) United States Patent
Xiong et al.

(10) Patent No.: US 10,150,374 B2
(45) Date of Patent: Dec. 11, 2018

(54) ELECTRIC VEHICLE SUPPLY EQUIPMENT AND A METHOD OF DETERMINING A STATE OF A CONTACTOR IN ELECTRIC VEHICLE SUPPLY EQUIPMENT

(71) Applicant: EATON CORPORATION, Cleveland, OH (US)

(72) Inventors: Tom Xiong, Shanghai (CN); Jackie Hao, Suzhou (CN); Andrew Yang, Shanghai (CN); Darron Kirby Lacey, Peachtree City, GA (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 132 days.

(21) Appl. No.: 15/337,762

(22) Filed: Oct. 28, 2016

(65) Prior Publication Data

US 2018/0118042 A1 May 3, 2018

(51) Int. Cl.
*B60L 11/18* (2006.01)
*B60L 3/00* (2006.01)

(52) U.S. Cl.
CPC ............ *B60L 11/1818* (2013.01); *B60L 3/00* (2013.01); *B60L 11/1824* (2013.01); *B60L 11/1838* (2013.01); *B60L 2230/10* (2013.01)

(58) Field of Classification Search
CPC .............. B60L 11/1816; B60L 11/1818; B60L 11/1824; B60L 2230/00; B60L 2230/10
See application file for complete search history.

(56) References Cited

U.S. PATENT DOCUMENTS

| | | | | |
|---|---|---|---|---|
| 9,662,987 | B2 * | 5/2017 | Hein | B60L 11/1816 |
| 2011/0279082 | A1 * | 11/2011 | Hagenmaier, Jr. | B60L 11/1824 320/109 |
| 2012/0313562 | A1 * | 12/2012 | Murao | B60L 3/0046 318/139 |
| 2014/0333311 | A1 * | 11/2014 | Liu | G01R 31/327 324/418 |
| 2016/0121736 | A1 * | 5/2016 | Jefferies | B60L 3/0069 320/109 |
| 2018/0043786 | A1 * | 2/2018 | Corbeil | B60L 11/1824 |

* cited by examiner

*Primary Examiner* — Levi Gannon
(74) *Attorney, Agent, or Firm* — Eckert Seamans

(57) ABSTRACT

Electric vehicle supply equipment includes a contactor having a first set of contacts and a second set of contacts, an amplifier circuit electrically connected to the load side output of the first set of contacts via a first connection and to the load side output of the second set of contacts via a second connection, the amplifier circuit being structured to amplify a voltage difference between a first voltage at the first connection and a second voltage at the second connection, and control electronics structured to compare the amplified voltage difference to a threshold voltage and to determine whether the first and second sets of contacts are closed based on the comparison between the amplified voltage difference and the threshold voltage.

18 Claims, 4 Drawing Sheets

ELECTRIC VEHICLE SUPPLY EQUIPMENT AND A METHOD OF DETERMINING A STATE OF A CONTACTOR IN ELECTRIC VEHICLE SUPPLY EQUIPMENT

BACKGROUND

Field

The disclosed concept pertains generally to electric vehicle supply equipment and, more particularly, to contactor state detection circuits for electric vehicle supply equipment. The method also pertains to a method of determining a state of a contact in electric vehicle supply equipment.

Background Information

An electric vehicle (EV) charging station, also called an EV charging station, electric recharging point, charging point, and EVSE (Electric Vehicle Supply Equipment), is an element in an infrastructure that supplies electric energy for the recharging of electric vehicles, plug-in hybrid electric-gasoline vehicles, or semi-static and mobile electrical units such as exhibition stands.

An EV charging station is a device that safely allows electricity to flow. These charging stations and the protocols established to create them are known as EVSE, and they enhance safety by enabling two-way communication between the charging station and the electric vehicle.

The 1996 NEC and California Article 625 define EVSE as being the conductors, including the ungrounded, grounded, and equipment grounding conductors, the electric vehicle connectors, attachment plugs, and all other fittings, devices, power outlets or apparatus installed specifically for the purpose of delivering energy from premises wiring to an electric vehicle.

EVSE is defined by the Society of Automotive Engineers (SAE) recommended practice J1772 and the National Fire Protection Association (NFPA) National Electric Code (NEC) Article 625. While the NEC defines several safety requirements, J1772 defines the physical conductive connection type, five pin functions (i.e., two power pins (Hot1 and Hot2 or neutral; or Line 1 and Line 2), one ground pin 3, one control pilot pin 4, and one proximity pin 5), the EVSE to EV handshake over the pilot pin 4, and how both parts (EVSE and EV) are supposed to function. FIG. 1 is a block diagram in schematic form of a charging system 100 compliant with the J1772 standard.

Two-way communication seeks to ensure that the current passed to the EV is both below the limits of the EV charging station itself and below the limits of what the EV can receive. There are additional safety features, such as a safety lock-out that does not allow current to flow from the EV charging station until the EV connector or EV plug is physically inserted into the EV and the EV is ready to accept energy.

J1772 in North America and IEC 61851 standard use a very simple but effective pilot circuit and handshake in the EVSE. For charging a vehicle using alternating current (AC), basically a signal is generated on the pilot pin 4 of FIG. 1, 12 Vdc open circuit when measured to ground pin 3. When the EVSE cable and connector 10 is plugged into an EV inlet 11 of a compliant vehicle 12, the vehicle's circuit has a resistor 14 and a diode 16 in series that ties to ground 18 in order to drop the 12 Vdc to 9 Vdc. After the EVSE 20 sees this drop in voltage, it turns on a pulse-width modulated (PWM) generator in control electronics 22 that defines the maximum available line current (ALC) on the charging circuit. The vehicle charge controller 24 reads the percentage of the duty cycle of the PWM signal, which is equivalent to a certain amperage, and sets the maximum current draw on the onboard vehicle rectifier/charger 26, in order to not trip an upstream circuit interrupter (not shown). The vehicle 12, in turn, adds another resistor 28 in parallel with the resistor 14 of the vehicle's resistor and diode 14,16 series combination, which then drops the top level of the PWM pilot signal to 6 Vdc. This tells the EVSE 20 that the vehicle 12 is ready to charge. In response, the EVSE 20 closes an internal relay/contactor 30 to allow AC power to flow to the vehicle 12.

The contactor 30 includes a first set of contacts 32 and a second set of contacts 34. The EVSE 20 includes a first differential amplifier circuit 40 that is electrically connected to a line side output of the first set of contacts 32 via a first connection 44 and to a load side output of the first set of contacts 32 via a second connection 46. The EVSE 20 also includes a second differential amplifier circuit 42 that is electrically connected to a line side output of the second set of contacts 34 via a third connection 48 and to a load side output of the second set of contacts 34 via a fourth connection 50. The first differential amplifier circuit 40 amplifies a difference in voltage between the line side output and the load side output of the first set of contacts 32 and the second differential amplifier circuit 42 amplifies a difference in voltage between the line side output and the load side output of the second set of contacts 34 and outputs the amplified voltage differences to the control electronics 22.

The control electronics 22 determine, from the amplified voltage differences received from the first and second differential amplifier circuits 40,42, whether the first and/or second sets of contacts 32,34 are open or closed. For example, when there is little or no difference in the voltages between the line and load side outputs of one of the set of contacts 32,34, it is an indication that the set of contacts is closed.

Using the circuit arrangement shown in FIG. 1 and, namely the first and second differential amplifier circuits 40,42, to determine the status of the first and second sets of contacts 32,34 is, however, not without problems. For example, the differential amplifier circuits 40,42 are connected to both the line and load sides of the sets of contacts 32,34 which creates a physical connection between the line and load sides of the sets of contacts 32,34. While the differential amplifier circuits 40,42 can provide circuit isolation between the line and load side outputs of the sets of contacts 32,34, they do not provide physical isolation. A fault in the circuitry of the differential amplifier circuits 32,34 could potentially cause the circuit isolation to fail and allow power to flow between the line and load side outputs of the sets of contacts 40,42 even when the sets of contacts 32,34 are open.

There is room for improvement in EVSE including, for example, circuitry for determining whether contacts in the EVSE are open or closed.

There is also room for improvement in method of determining the state of the contactor in EVSE.

SUMMARY

This need and others are met by embodiments of the disclosed concept in which an EVSE includes circuitry for determining the state of the contactor that is only connected to the load side of the contactor. This need and others are also met by a method for determining the state of the contactor in EVSE provided by embodiments of the disclosed concept.

In accordance with aspects of the disclosed concept, electric vehicle supply equipment comprises: a contactor having a first set of contacts and a second set of contacts, wherein the first and second sets of contacts each have a line side output structured to electrically couple to an electrical supply and a load side output structured to electrically couple to an electric vehicle; an amplifier circuit electrically connected to the load side output of the first set of contacts via a first connection and to the load side output of the second set of contacts via a second connection, the amplifier circuit being structured to amplify a voltage difference between a first voltage at the first connection and a second voltage at the second connection; and control electronics structured to compare the amplified voltage difference to a threshold voltage and to determine whether the first and second sets of contacts are closed based on the comparison between the amplified voltage difference and the threshold voltage.

In accordance with other aspects of the disclosed concept, a method of determining a state of a contactor in electric vehicle supply equipment is provided. The contactor has a first set of contacts and a second set of contacts, wherein the first and second sets of contacts each have a line side output structured to electrically couple to an electrical supply and a load side output structured to electrically couple to an electric vehicle, and the method comprises: providing an amplifier circuit electrically connected to the load side output of the first set of contacts via a first connection and to the load side output of the second set of contacts via a second connection, the amplifier circuit being structured to amplify a voltage difference between a first voltage at the first connection and a second voltage at the second connection; comparing the amplified voltage difference to a threshold voltage; and determining whether the first and second sets of contacts are closed based on the comparison between the amplified voltage difference and the threshold voltage.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

As employed herein, the term "number" shall mean one or an integer greater than one (i.e., a plurality).

As employed herein, the term "processor" shall mean a programmable analog and/or digital device that can store, retrieve, and process data; a computer; a workstation; a personal computer; a microprocessor; a microcontroller; a microcomputer; a central processing unit; a mainframe computer; a mini-computer; a server; a networked processor; or any suitable processing device or apparatus.

As employed herein, the statement that two or more parts are "connected" or "coupled" together shall mean that the parts are joined together either directly or joined through one or more intermediate parts. Further, as employed herein, the statement that two or more parts are "attached" shall mean that the parts are joined together directly.

As employed herein, the term "circuit isolation" shall mean using one or more solid state circuit elements (e.g., without limitation, a transistor, an operational amplifier, etc.) to electrically isolate two parts of a circuit from each other.

As employed herein, the term "physical isolation" shall mean physically separating an electrical connection between two parts of a circuit. For example, opening separable contacts or a mechanical switch can provide physical isolation.

Furthermore, as employed herein, the terms circuit isolation and physical isolation are mutually exclusive. For example, if circuit isolation is provided between two parts of a circuit then physical isolation is not provided between the two parts of the circuit. The solid state circuit elements that are relied on to provide the circuit isolation are considered to be a physically connected electrical connection between the two parts of the circuit. Similarly, if physical isolation is provided between two parts of a circuit then circuit isolation is not provided between the two parts of the circuit.

As employed herein, the term "amplify" shall mean to multiply by a gain. The gain may be greater than, less than, or equal to one. That is, the term "amplify", as employed herein, does not infer increasing the level of a signal.

Figure 1:
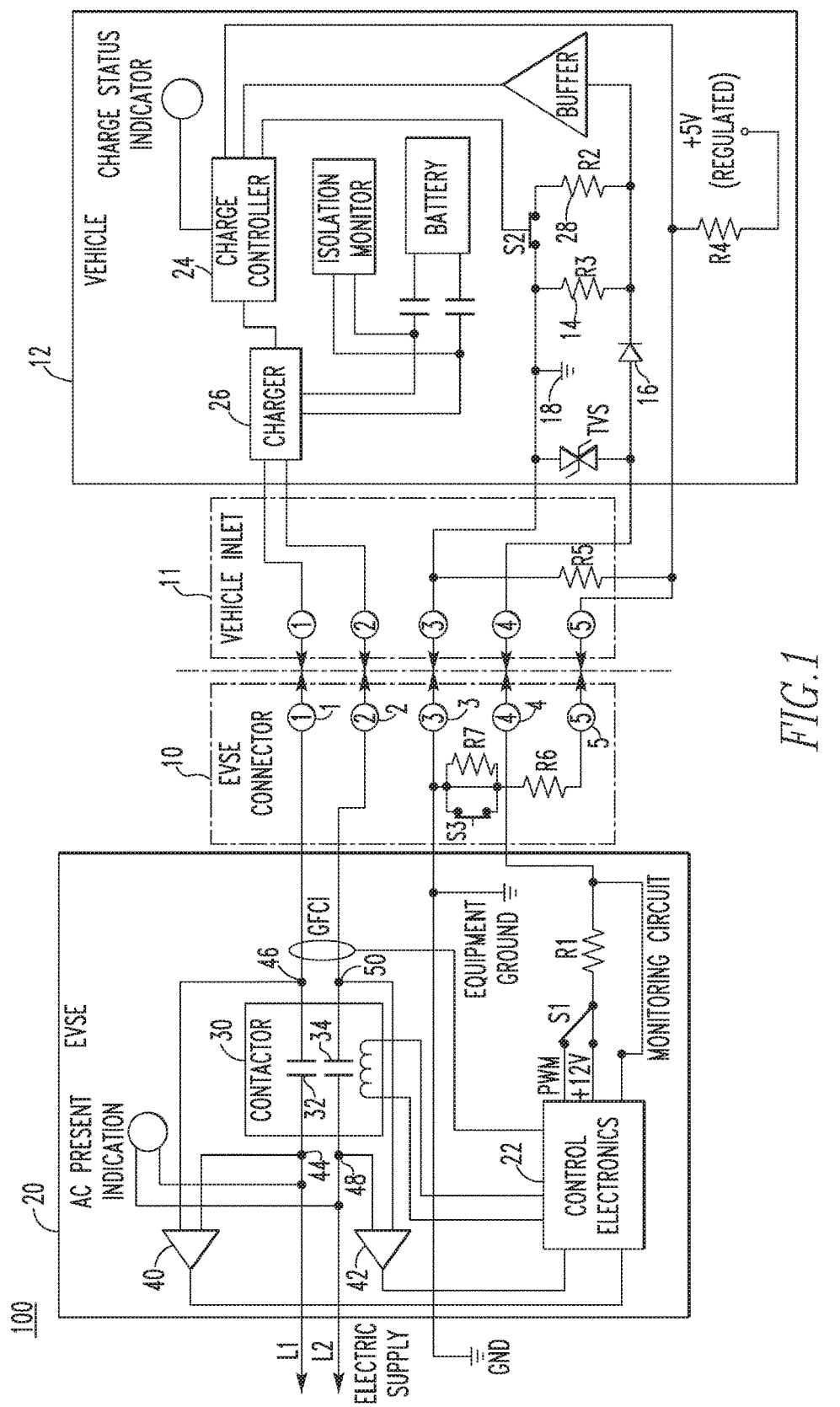
FIG. 1 is a block diagram in schematic form of an electric vehicle supply equipment (EVSE) to electric vehicle (EV) system.
Figure 2:
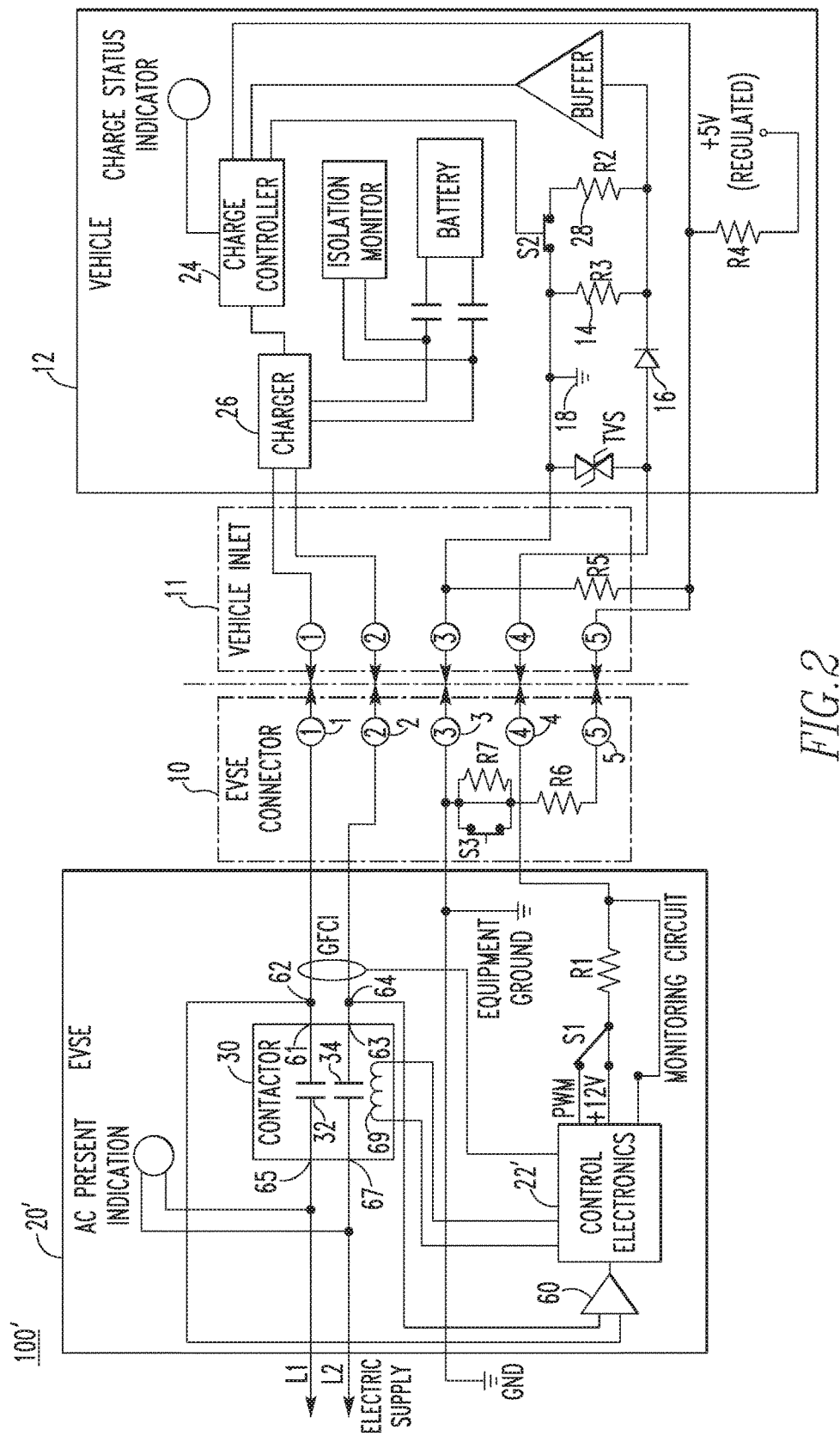
FIG. 2 is a block diagram in schematic form of an EVSE to EV system in accordance with embodiments of the disclosed concept.

FIG. 2 is a block diagram in schematic form of a charging system 100' in accordance with an example embodiment of the disclosed concept. The charging system 100' of FIG. 2 is compatible with the EVSE connector 10, the vehicle inlet 11 and the vehicle 12 previously described with respect to FIG. 1. For economy of disclosure, additional description of the EVSE connector 10, the vehicle inlet 11 and the vehicle 12 is omitted. However, the EVSE 20' in the system 1' of FIG. 2 differs from the EVSE 20 of the system 1 of FIG. 1. More particularly, the EVSE 20' of FIG. 2 includes different circuitry for detecting whether the sets of contacts 32,34 in the contactor 30 are open or closed than the EVSE 20 of FIG. 1.

In more detail, the EVSE 20' includes a differential amplifier circuit 60. The differential amplifier circuit 60 is electrically connected to the load side output 61 of the first set of contacts 32 via a first connection 62 and to the load side output 63 of the second set of contacts 34 via a second connection 64. The load side outputs 61,63 of the first and second sets of contacts 32,34 are outputs of the contactor 30 that are structured to electrically couple with the electric vehicle 12. In contrast, line side outputs 65,67 of the first and second sets of contacts 32,34 are outputs of the contactor 30 that are structured to electrically couple with an electric supply.

The differential amplifier circuit 60 is structured to amplify a difference in voltage between a first voltage rat the first connection 62 and a second voltage at the second connection 50. In other words, the differential amplifier circuit 60 is structured to amplify a difference in voltage between the load side outputs 61,63 of the first and second sets of contacts 32,34. The differential amplifier circuit 60 is also electrically connected to control electronics 22' and is structured to output the amplified voltage difference to the control electronics 22'.

The control electronics 22' are structured to determine if the sets of contacts 32,34 in the contactor 30 are both closed or if one or more of the sets of contacts 32,34 in the contactor 30 are open. The determination may be used to verify whether the sets of contacts 32,34 have properly opened or closed.

For example, the EVSE 20' may include an operating mechanism 69 (e.g., without limitation, a solenoid) that is structured to open and close the first and second sets of contacts 32,34. The operating mechanism 69 may be structured to open the first and second sets of contacts 32,34 together and to close the first and second sets of contacts 32,34 together. The control electronics 22' may be electrically connected to the operating mechanism 69 and may control the operating mechanism 69 to open or close the first and second sets of contacts 32,34 by outputting a control signal. The control signal should cause the first and second sets of contacts 32,34 to open or close, but a failure in equipment may result in first and second sets of contacts 32,34 not opening or closing as intended. In response to outputting the control signal, the control electronics 22' may determine whether the first and second sets of contacts 32,34 are both closed or if one or more of the first and second sets of contacts 32,34 are open as a verification step. If the first and second sets of contacts 32,34 are not in their intended state, the control electronics 22' may output an alarm signal or other notification signal indicating a fault.

In some example embodiments of the disclosed concept, in the case that the control electronics 22' output a signal to cause the first and second sets of contacts 32,34 to close, but determine that first and second sets of contacts 32,34 are still open, the control electronics 22' may output the signal to cause the first and second sets of contacts 32,34 to close a predetermined number of times (e.g., three times), determining each time whether the first and second sets of contacts 32,34 have closed. If it is determined that the first and second sets of contacts 32,34 have remained open after the predetermined number of attempts at closing the first and second sets of contacts 32,34, the control electronics 22' may stop attempting to close the first and second sets of contacts 32,34. The control electronics 22' may output an alarm or other signal indicating the status of the first and second sets of contacts 32,34. Similarly, in the case that the control electronics 22' output a signal to cause the first and second sets of contacts 32,34 to open, but determine that first and second sets of contacts 32,34 are still closed, the control electronics 22' may output the signal to cause the first and second sets of contacts 32,34 to open a predetermined number of times (e.g., three times), determining each time whether the first and second sets of contacts 32,34 have opened. If it is determined that the first and second sets of contacts 32,34 have remained closed after the predetermined number of attempts at opening the first and second sets of contacts 32,34, the control electronics 22' may stop attempting to open the first and second sets of contacts 32,34. The control electronics 22' may output an alarm or other signal indicating the status of the first and second sets of contacts 32,34.

In some example embodiments of the disclosed concept, rather than outputting the control signal to open or close the first and second sets of contacts 32,34 a predetermined number of times, the control electronics 22' may repeatedly output the control signal until the first and second sets of contacts 32,34 change to their intended state. For example, when controlling the first and second sets of contacts 32,34 to open, the control electronics 22' may repeatedly output the control signal to open the first and second sets of contacts 32,34 until it determines that they have opened. In some example embodiments of the disclosed concept, the control electronics 22' are structured to output the control signal to close the first and second sets of contacts 32,34 a predetermined number of times and to output the control signal to open the first and second sets of contacts 32,34 repeatedly until they open. Leaving the first and second sets of contacts 32,34 in the closed state can be more problematic than leaving them in the open state so it can be beneficial to try to open the first and second sets of contacts 32,34 repeatedly until they open.

In some embodiments of the disclosed concept, the control electronics 22' are structured to compare the amplified voltage difference received from the differential amplifier circuit 60 to a threshold voltage. If the amplified voltage difference received from the differential amplifier circuit 60 is greater than or equal to the threshold voltage, the control electronics 22' may determine that both sets of separable contacts 32,34 are closed. On the other hand, if the amplified voltage difference received from the differential amplifier circuit 60 is less than the threshold voltage, the control electronics 22' may determine that one or more of the sets of contacts 32,34 are open. In some example embodiments of the disclosed concept, the threshold voltage may be about 200 V. In some example embodiments of the disclosed concept, the threshold voltage is about 36 V. However, it will be appreciated by those having ordinary skill in the art that any suitable threshold voltage may be used without departing from the scope of the disclosed concepts.

Via the differential amplifier circuit 60 and the control electronics 22', the EVSE 20' is able to determine whether both sets of contacts 32,34 of the contactor 30 are closed or whether one or more sets of contacts 32,34 of the contactor 30 are open. Moreover, unlike the EVSE 20 shown in FIG. 1, the differential amplifier circuit 60 is only electrically connected to the load side outputs 61,63 of the contactor 30 so it does not form a physical connection between the line side outputs 65,67 and load side outputs 61,63 of the contactor 30. When the sets of contacts 32,34 in the contactor 30 are open, there is physical isolation between the line and load sides of the contactor 30. The EVSE 20' does not need to rely on electrical components to provide circuit isolation between the line side outputs 65,67 and the load side outputs 61,63 of the contactor 30 as the EVSE 20 of FIG. 1 does. The physical isolation between the line side outputs 65,67 and the load side outputs 61,63 of the contactor 30 provided by the EVSE 20' is preferable to the circuit isolation between the line and load sides of the contactor 30 provided by the EVSE 20 of FIG. 1.

Additionally, the EVSE 20' uses one differential amplifier circuit 60 and two connections 62,64 to the load side outputs 61,63 of the contactor 30 while the EVSE 20 of FIG. 1 uses two differential amplifier circuits 40,42, two connections 46,50 to the load side of the contactor 30, and two connections 44,48 to the line side of the contactor 30. The reduced number of components and connections in the EVSE 20' compared to the EVSE 20 is beneficial to reducing cost and complexity.

Figure 3:
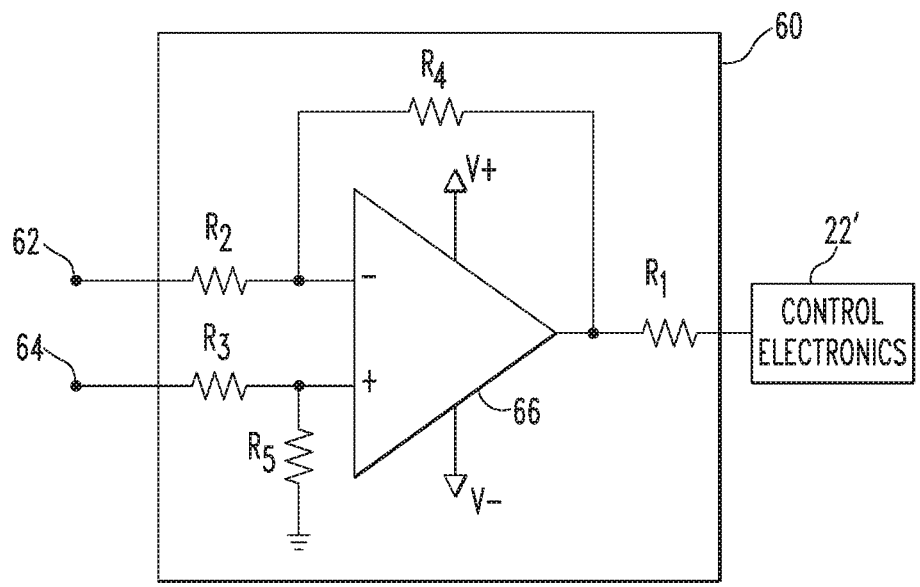
FIG. 3 is a circuit diagram of a differential amplifier circuit in accordance with embodiments of the disclosed concept.

Referring to FIG. 3, a circuit diagram of the differential amplifier circuit 60 in accordance with an example embodiment of the disclosed concept is shown. In the example embodiment shown in FIG. 3, the differential amplifier circuit 60 includes an operational amplifier 66 and four resistors $R_1$, $R_2$, $R_3$, $R_4$ electrically connected in a differential amplifier configuration. In more detail, resistor $R_1$ is electrically connected between an output of the operational amplifier 66 and the control electronics 22'. Resistor $R_1$ is electrically connected between the first connection 62 (i.e., the connection to the load side of the first set of contacts 32) and a inverting input of the operational amplifier 66. Resistor $R_2$ is electrically connected between the second connection 64 (i.e., the connection to the load side of the second set of contacts 34) and a non-inverting input of the operational amplifier. Resistor $R_3$ is electrically connected between ground and the non-inverting input of the operational amplifier. Resistor $R_4$ is electrically connected between the inverting input of the operational amplifier 66 and the output of the operational amplifier 66. The operational amplifier 66 may be powered by a positive supply voltage $V_+$ and a negative supply voltage $V_-$.

The differential amplifier circuit 60 amplifies the difference between the voltage at the first connection 62 and the voltage at the second connection 64 by a gain of the differential amplifier circuit 60. The gain of the differential amplifier circuit 60 may be determined from the values of resistors $R_2$, $R_3$, $R_4$, $R_5$. The gain of the differential amplifier circuit 60 may thus be set to a desired level by selecting values of resistors $R_2$, $R_3$, $R_4$, $R_5$. Additionally, the gain of the differential amplifier circuit 60 may be set to any suitable level. It will be appreciated by those having ordinary skill in the art that the gain of the differential amplifier circuit 60 may be equal to, less than, or greater than one. For example, in some embodiments of the disclosed concept, the gain of the differential amplifier circuit 60 may be 0.025. Thus, the voltage at the output of the differential amplifier circuit 60 will be 0.025 times the voltage difference at the input of the differential amplifier circuit 60.

In some example embodiments of the disclosed concept, the values of the resistors $R_1$, $R_2$, $R_3$, $R_4$, $R_5$ are 100 kΩ for resistors $R_1$, $R_4$ and $R_5$ and 4 MΩ for resistors $R_2$ and $R_3$. In some example embodiments of the disclosed concept, the value positive supply voltage $V_+$ is 12V and the value of the negative supply voltage $V_-$ is -12V. However, it will be appreciated by those having ordinary skill in the art that any values for the resistors $R_1$, $R_2$, $R_3$, $R_4$, $R_5$ and the supply voltages $V_+$, $V_-$ may be selected without departing from the scope of the disclosed concept.

While one arrangement of the differential amplifier circuit 60 in accordance with an example embodiment of the disclosed concept is shown in FIG. 3 is shown, it will be appreciated that differential amplifier circuit 60 may include various different electrical components and various arrangements of such electrical components without departing from the scope of the disclosed concept. For example and without limitation, the differential amplifier circuit 60 may be replaced with different types of amplifier or comparator circuits without departing from the scope of the disclosed concept.

Figure 4:
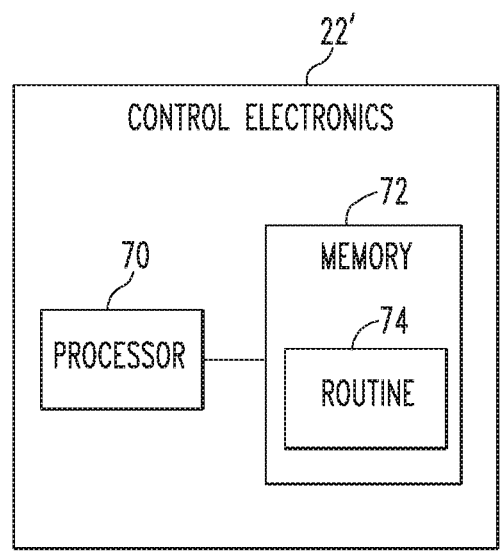
FIG. 4 is a block diagram in schematic form of control electronics in accordance with embodiments of the disclosed concept.

Referring to FIG. 4, a schematic diagram of the control electronics 22' in accordance with an example embodiment of the disclosed concept is shown. The control electronics include a processor 70 and a memory 72 including a routine 74. It will be appreciated that the control electronics 22' may also include various other components without departing from the scope of the disclosed concept.

The processor 70 may be, for example and without limitation, a microprocessor, a microcontroller, or some other suitable processing device or circuitry. The memory 72 may be any of one or more of a variety of types of internal and/or external storage media such as, without limitation, RAM, ROM, EPROM(s), EEPROM(s), FLASH, and the like that provide a storage register, i.e., a machine readable medium, for data storage such as in the fashion of an internal storage area of a computer, and can be volatile memory or nonvolatile memory. The routine 74, when executed by the processor 70, may cause the processor 70 to implement selected functionality based on the routine. In some embodiments of the disclosed concept, the memory 72 and the routine 74 may be incorporated into the processor 70.

Figure 5:
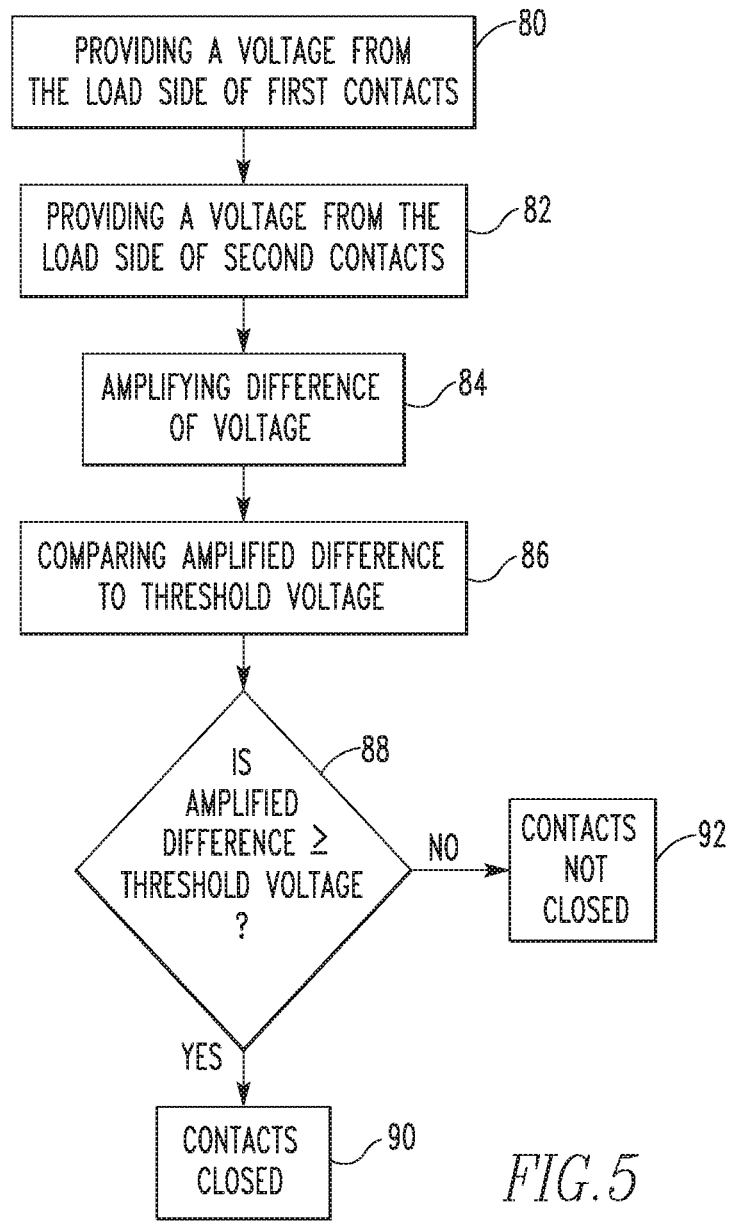
FIG. 5 is a flowchart of a method of determining a state of a contactor in EVSE in accordance with embodiments of the disclosed concept.

FIG. 5 illustrates a flowchart of a method of determining whether the sets of contacts 32,34 in the contactor 30 are closed. The method of FIG. 5 may be implemented in the EVSE 20'. At 80, voltage is provided from the load side output 61 of the first set of contacts 32 and, at 82, voltage is provided from the load side output 63 of the second set of contacts 34. As previously described, the voltages may be provided via connections 62 and 64. At 84, the difference between the voltages is amplified. The difference between the voltages may be amplified by the differential amplifier circuit 60.

At 86, the amplified difference is compared to a threshold voltage. At 88, it is determined whether the amplified difference is greater than or equal to the threshold voltage. If the amplified difference is greater than or equal to the threshold voltage, at 90 it is determined that the sets of contacts 32,34 in the contactor 30 are closed. Otherwise, it is determined that one or more of the sets of contacts 32,34 in the contactor 30 are not closed at 92. In accordance with some embodiments of the disclosed concept, steps 86, 88, 90, and 92 may be performed by the control electronics 22'. For example, the processor 70 executing the routine 74 may cause the processor 70 to implement steps 86, 88, 90, and 92.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. Electric vehicle supply equipment comprising:
   a contactor having a first set of contacts and a second set of contacts, wherein the first and second sets of contacts each have a line side output structured to electrically couple to an electrical supply and a load side output structured to electrically couple to an electric vehicle;
   an amplifier circuit electrically connected to the load side output of the first set of contacts via a first connection and to the load side output of the second set of contacts via a second connection, the amplifier circuit being structured to amplify a voltage difference between a first voltage at the first connection and a second voltage at the second connection; and
   control electronics structured to compare the amplified voltage difference to a threshold voltage and to determine whether the first and second sets of contacts are closed based on the comparison between the amplified voltage difference and the threshold voltage,
   wherein the line side outputs of the first and second sets of contacts are physically isolated from the load side outputs of the first and second sets of contacts when the first and second sets of contacts are open.

2. The electric vehicle supply equipment of claim 1, wherein the control electronics are structured to determine that the first and second sets of contacts are closed when the amplified voltage difference is greater than or equal to the threshold voltage.

3. The electric vehicle supply equipment of claim 2, wherein the control electronics are structured to determine that at least one of the first and second sets of contacts are open when the amplified voltage difference is less than the threshold voltage.

4. The electric vehicle supply equipment of claim 1, wherein the amplifier is a differential amplifier.

5. The electric vehicle supply equipment of claim 4, wherein the differential amplifier includes:
   an operational amplifier having an inverting input, a non-inverting input, and an output;
   a first resistor electrically connected between the output of the operational amplifier and the control electronics;
   a second resistor electrically connected between the first connection and the inverting input of the operational amplifier;
   a third resistor electrically connected between the second connection and the non-inverting input of the operational amplifier;
   a fourth resistor electrically connected between the inverting input of the operational amplifier and the output of the operational amplifier; and
   a fifth resistor electrically connected between the non-inverting input of the operational amplifier and ground.

6. The electric vehicle supply equipment of claim 5, wherein the first, fourth, and fifth resistors have a resistance of about 100 kΩ and the second and third resistors have a resistance of about 4 MΩ.

7. The electric vehicle supply equipment of claim 5, wherein a resistance of the second resistor is about equal to a resistance of the third resistor and a resistance of the fourth resistor is about equal to a resistance of the fifth resistor.

8. The electric vehicle supply equipment of claim 5, wherein the operational amplifier is power by a positive supply voltage of about 12 V and a negative supply voltage of about −12 V.

9. The electric vehicle supply equipment of claim 4, wherein the differential amplifier has a gain of about 0.025.

10. The electric vehicle supply equipment of claim 1, wherein the control electronics includes a processor and a memory including a routine which, when executed by the processor, causes the processor to compare the amplified voltage difference to a threshold voltage and to determine whether the first and second sets of contacts are closed based on the comparison between the amplified voltage difference and the threshold voltage.

11. The electric vehicle supply equipment of claim 1, wherein the electric vehicle supply equipment is J1772-compliant.

12. The electric vehicle supply equipment of claim 1, wherein the electric vehicle supply equipment is structured to electrically connect an electric supply to the electric vehicle; and wherein opening the first and second sets of contacts breaks the electrical connection between the electrical supply and the electric vehicle.

13. Electric vehicle supply equipment comprising:
   a contactor having a first set of contacts and a second set of contacts, wherein the first and second sets of contacts each have a line side output structured to electrically couple to an electrical supply and a load side output structured to electrically couple to an electric vehicle;
   an amplifier circuit electrically connected to the load side output of the first set of contacts via a first connection and to the load side output of the second set of contacts via a second connection, the amplifier circuit being structured to amplify a voltage difference between a first voltage at the first connection and a second voltage at the second connection; and
   control electronics structured to compare the amplified voltage difference to a threshold voltage and to determine whether the first and second sets of contacts are closed based on the comparison between the amplified voltage difference and the threshold voltage, wherein the control electronics are electrically connected to an operating mechanism structured to open and close the first and second sets of contacts; and wherein the control electronics are structured to output a control signal to control the operating mechanism to open or close the first and second sets of contacts.

14. The electric vehicle supply equipment of claim 13, wherein the control electronics are structured to compare the amplified voltage difference to a threshold voltage and to determine whether the first and second sets of contacts are closed based on the comparison between the amplified voltage difference and the threshold voltage in response to outputting the control signal to the operating mechanism.

15. The electric vehicle supply equipment of claim 13, wherein the operating mechanism is structured to open the first and second sets of contacts together and to close the first and second sets of contacts together.

16. A method of determining a state of a contactor in electric vehicle supply equipment, the contactor having a first set of contacts and a second set of contacts, wherein the first and second sets of contacts each have a line side output structured to electrically couple to an electrical supply and a load side output structured to electrically couple to an electric vehicle, wherein the method comprises:
   providing an amplifier circuit electrically connected to the load side output of the first set of contacts via a first connection and to the load side output of the second set of contacts via a second connection, the amplifier circuit being structured to amplify a voltage difference between a first voltage at the first connection and a second voltage at the second connection;
   comparing the amplified voltage difference to a threshold voltage; and
   determining whether the first and second sets of contacts are closed based on the comparison between the amplified voltage difference and the threshold voltage,
   wherein the line side outputs of the first and second sets of contacts are physically isolated from the load side outputs of the first and second sets of contacts when the first and second sets of contacts are open.

17. The method of claim 16, further comprising:
   determining that the first and second sets of contacts are closed when the amplified voltage difference is greater than or equal to the threshold voltage.

18. The method of claim 17, further comprising:
   determining that at least one of the first and second sets of contacts are open when the amplified voltage difference is less than the threshold voltage.

* * * * *